United States Patent [19]

Judice

[11] 4,013,828
[45] Mar. 22, 1977

[54] METHOD AND ARRANGEMENT FOR REDUCING THE BANDWIDTH AND/OR TIME REQUIRED TO TRANSMIT A DITHERED IMAGE

[75] Inventor: Charles Norris Judice, Lincroft, N.J.

[73] Assignee: Bell Telephone Laboratories, Incorporated, Murray Hill, N.J.

[22] Filed: Feb. 20, 1976

[21] Appl. No.: 659,723

[52] U.S. Cl. .......................... 358/133; 178/DIG. 3; 358/209

[51] Int. Cl.² ........................................ H04N 7/12

[58] Field of Search ................... 178/6, DIG. 3, 6.8

[56] References Cited

UNITED STATES PATENTS

| | | | |
|---|---|---|---|
| 3,504,112 | 3/1970 | Gruenberg | 178/6 |
| 3,976,826 | 8/1976 | Fullton | 178/6 |

OTHER PUBLICATIONS

D. A. Huffman, "A Method for the Construction of Minimum Redundancy Codes", Proc. IRE., vol. 40 (Sept. 1952) pp. 1098-1101.

Univ. of Illinois Master's Thesis of A. B. White, "Video Imaging on the Plasa Display Panel", Apr. 1975, pp. 64-73.

Primary Examiner—John C. Martin
Assistant Examiner—Edward L. Coles
Attorney, Agent, or Firm—Ronald D. Slusky

[57] ABSTRACT

An image is scanned and dither processed in picture element groups of predetermined size, each corresponding to a group of cells of a remotely located display panel. As each picture element group is scanned, the pattern represented by the corresponding dithered image bits is compared to a dictionary of patterns stored in a first memory. If the pattern is not among those then in the memory, it is assigned an associated code word and is entered into the memory. In addition, both the pattern and its code word are transmitted to the remote location. They are there stored in a second memory, and individual cells of the cell group corresponding to the scanned picture elements are energized in accordance with the pattern. If, on the other hand, a scanned pattern is the same as one already stored in the first memory, only the code word associated with that pattern is transmitted to the remote location. The code word is used at the remote location to retrieve the associated pattern from the second memory when it is displayed at the corresponding cell group of the display panel.

20 Claims, 6 Drawing Figures

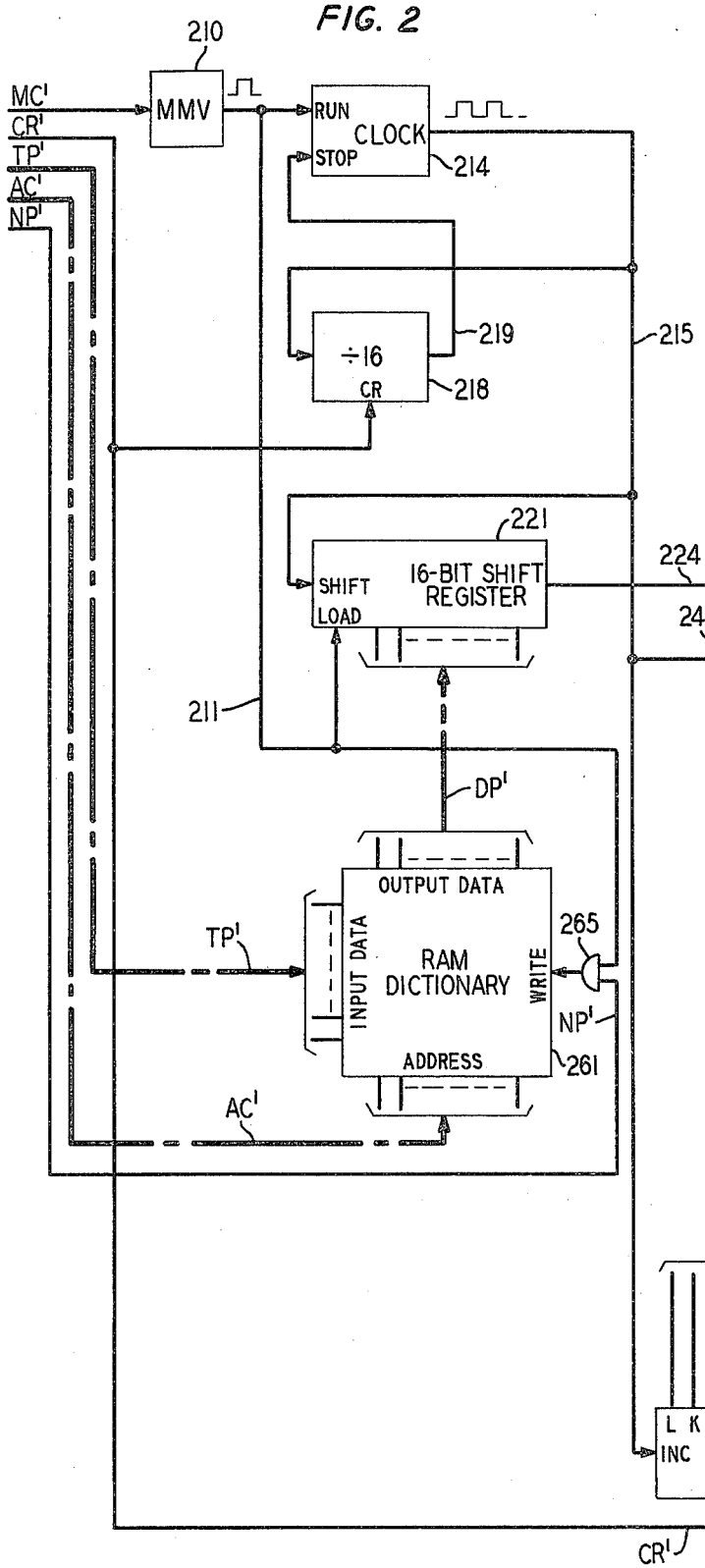
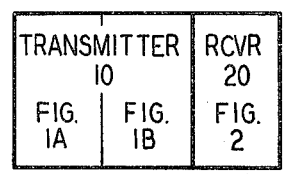
FIG. 2
FIG. 3

FIG. 4

| ROWS \ COLUMNS | 0 | 1 | 2 | 3 | 4 | 5 | 6 | 7 | --- | 61 | 62 | 63 |
|---|---|---|---|---|---|---|---|---|---|---|---|---|
| 0 | 60/0 | 50/128 | 48/32 | 43/160 | 41/0 | 69/128 | 85/32 | 72/160 | --- | 41/128 | 78/32 | 79/160 |
| 1 | 53/192 | 65/64 | 69/224 | 72/96 | 55/192 | 79/64 | 62/224 | 74/96 | | 60/64 | 81/224 | 83/96 |
| 2 | 69/48 | 65/176 | 62/16 | 78/144 | 81/48 | 76/176 | 62/16 | 81/144 | | 114/176 | 111/16 | 121/144 |
| 3 | 32/240 | 81/112 | 58/208 | 86/80 | 69/240 | 102/112 | 86/208 | 117/80 | | 142/112 | 143/208 | 163/80 |
| 4 | 78/0 | 81/128 | 85/32 | 100/160 | 130/0 | 157/128 | 142/32 | 170/160 | | 110/128 | 272/32 | 218/160 |
| 5 | 88/192 | 123/64 | 142/224 | 182/96 | 157/192 | 196/64 | 192/224 | 211/96 | | 204/64 | 206/224 | 225/96 |
| 6 | 159/48 | 183/176 | 178/16 | 180/144 | 211/48 | 206/176 | 218/16 | 232/144 | | 234/176 | 246/16 | 218/144 |
| 7 | 156/240 | 190/112 | 183/208 | 225/80 | 209/240 | 225/112 | 234/208 | 225/80 | --- | 248/112 | 234/208 | 230/80 |
| ⋮ | | | | | | | | | | | | |
| 61 | 164/192 | 185/64 | 152/224 | 176/96 | 173/192 | 197/64 | 190/224 | 192/96 | --- | 196/64 | 225/224 | 220/96 |
| 62 | 119/48 | 105/176 | 105/16 | 128/144 | 137/48 | 157/176 | 161/16 | 166/144 | | 204/176 | 204/16 | 199/144 |
| 63 | 86/240 | 97/112 | 114/208 | 126/80 | 121/240 | 122/112 | 130/208 | 149/80 | --- | 183/112 | 182/208 | 215/80 |

FIG. 5

| ROWS \ COLUMNS | 0 | 1 | 2 | 3 | 4 | 5 | 6 | 7 | --- | 61 | 62 | 63 |
|---|---|---|---|---|---|---|---|---|---|---|---|---|
| 0 | 1 | 0 | 1 | 0 | 1 | 0 | 1 | 0 | --- | 0 | 1 | 0 |
| 1 | 0 | 1 | 0 | 0 | 0 | 1 | 0 | 0 | | 0 | 0 | 0 |
| 2 | 1 | 0 | 1 | 0 | 1 | 0 | 1 | 0 | | 0 | 1 | 0 |
| 3 | 0 | 0 | 0 | 1 | 0 | 0 | 0 | 1 | | 1 | 0 | 1 |
| 4 | 1 | 0 | 1 | 0 | 1 | 1 | 1 | 1 | | 0 | 1 | 1 |
| 5 | 0 | 1 | 0 | 1 | 0 | 1 | 0 | 1 | | 1 | 0 | 1 |
| 6 | 1 | 1 | 1 | 1 | 1 | 1 | 1 | 1 | | 1 | 1 | 1 |
| 7 | 0 | 1 | 0 | 1 | 0 | 1 | 1 | 1 | --- | 1 | 1 | 1 |
| ⋮ | | | | | | | | | | | | |
| 61 | 0 | 1 | 0 | 1 | 0 | 1 | 0 | 1 | --- | 1 | 1 | 1 |
| 62 | 1 | 0 | 1 | 0 | 1 | 1 | 1 | 1 | | 1 | 1 | 1 |
| 63 | 0 | 0 | 0 | 1 | 0 | 1 | 0 | 1 | --- | 1 | 0 | 1 |

METHOD AND ARRANGEMENT FOR REDUCING THE BANDWIDTH AND/OR TIME REQUIRED TO TRANSMIT A DITHERED IMAGE

BACKGROUND OF THE INVENTION

The present invention relates to video signal processing and, in particular, to a method and arrangement for reducing the bandwidth and/or time required to transmit continuous-tone images which have been processed for presentation on bi-level display media.

A bi-level display medium is characterized by a plurality of closely spaced display points, or cells, each of which can have one of two visual states — fully energized (on) or fully de-energized (off). Plasma panels and pin printers, for example, are common types of bi-level display media. Picture images and other graphic data are readily displayed on a bi-level display medium via selective energization of its cells. However, due to their bi-level nature, such display media, unlike cathode-ray tube arrangements, for example, are not capable of representing gray scale, i.e., a range of intensities, at each display point location. Nonetheless, the gray-scale information in an image can, advantageously, be approximated on a bi-level display medium by known thresholding techniques. The image to be presented is scanned in a row-and-column matrix of picture elements each corresponding to a cell of the display medium. The intensity of each picture element is quantized into one of, for example, 256 levels. A threshold value is assigned to each picture element in accordance with a predetermined criterion. A cell of the display medium is energized only if the intensity of the corresponding picture element exceeds the threshold value assigned thereto.

A number of thresholding techniques of the above-described type are known in the art, each having a different criterion for assigning appropriate threshold values to the scanned picture elements. For example, so-called adaptive threshold techniques assign threshold values in response to the intensities of selected picture elements in the scanned image. The constrained average technique disclosed in the copending patent application of J. F. Jarvis, Ser. No. 576,163, filed May 9, 1975, now U.S. Pat. No. 3,961,134 and assigned to the same assignee as this application, is exemplary.

So-called "non-adaptive" thresholding techniques, on the other hand, assign threshold values to each picture element solely in accordance with the position of that picture element in the picture element matrix. Foremost among the nonadaptive thresholding techniques is the ordered dither, or more simply "dither," technique. In a dithered display system, the picture elements are divided into a plurality of submatrices. Each picture element from each submatrix is assigned a spatially corresponding threshold value from a predetermined "dither matrix." A display cell is energized as described above, i.e., only if the intensity of the corresponding picture element exceeds the threshold value assigned to that picture element.

Since each cell of a bi-level display medium can be in only one of two states, its intensity can be specified by a single "display bit." By contrast, eight bits are required to specify in which of the 256 intensity levels each picture element of the original scanned image resides. The number of bits per picture element, or bit rate, determines the bandwidth per unit time or, equivalently, the time per unit bandwidth required to transmit a frame of video information. Thus an image processed via one of the above-described thresholding techniques can be transmitted at substantially reduced bandwidth and/or transmission time as compared to a full-gray-scale, e.g., standard television, image. (The tradeoff is slightly reduced spatial resolution and some loss of gray-scale information.) However, for many video systems it may be desired to reduce bandwidth and/or transmission time requirements even further since this almost invariably translates into lower capital and operating costs. Moreover, it appears that the economic feasibility of such still-experimental video systems as electronic mail and other fast facsimile arrangements will hinge to a great extent on the degree to which the bandwidth and/or transmission time required by such systems can be minimized.

SUMMARY OF THE INVENTION

Accordingly, a general object of the invention is to provide an improved video display system, and in particular, to provide a method and arrangement for minimizing the bandwidth and/or transmission time required by such systems to transmit images.

A more specific object of the invention is to provide a method and arrangement for minimizing the bandwidth and/or transmission time required to transmit images processed via the above-described thresholding techniques.

An $i$ row by $j$ column group of dithered image bits can represent any of $2^{(i \times j)}$ cell energization patterns since each display cell can reside in either of two states. For example, the bits of a 4 × 4 dithered image bit group can represent any of over 65,000 patterns. However, I have discovered that, typically, only a very small fraction of all possible patterns actually appear in a given dithered image (specific numbers are discussed hereinbelow), with a large number of these patterns appearing over and over again. A substantial reduction in the amount of data, and thus the bandwidth and/or time, necessary to transmit a dithered image to a remotely located display panel is thus achieved in an illustrative embodiment of the invention by assigning a code word to each different pattern which does appear in the image, transmitting each pattern and its code word only once to receiving circuitry for the display panel, and identifying to the receiving circuitry the states of the display cells of each $i \times j$ cell group by transmitting thereto the code word associated with the pattern in which those cells are to be energized.

BRIEF DESCRIPTION OF THE DRAWING

In the drawing,

FIGS. 1A, 1B and 2, when arranged as shown in FIG. 3, depict a dithered display system including pattern matching circuitry embodying the principles of the present invention;

FIG. 4 is a chart which shows quantized picture element intensity values of an illustrative image scanned by the dithered display system and which further shows the dither threshold values assigned to those picture elements; and FIG. 5 is a chart which shows the dithered image display bit values generated in response to the above-mentioned illustrative scanned image.

DETAILED DESCRIPTION

Figure 1A:
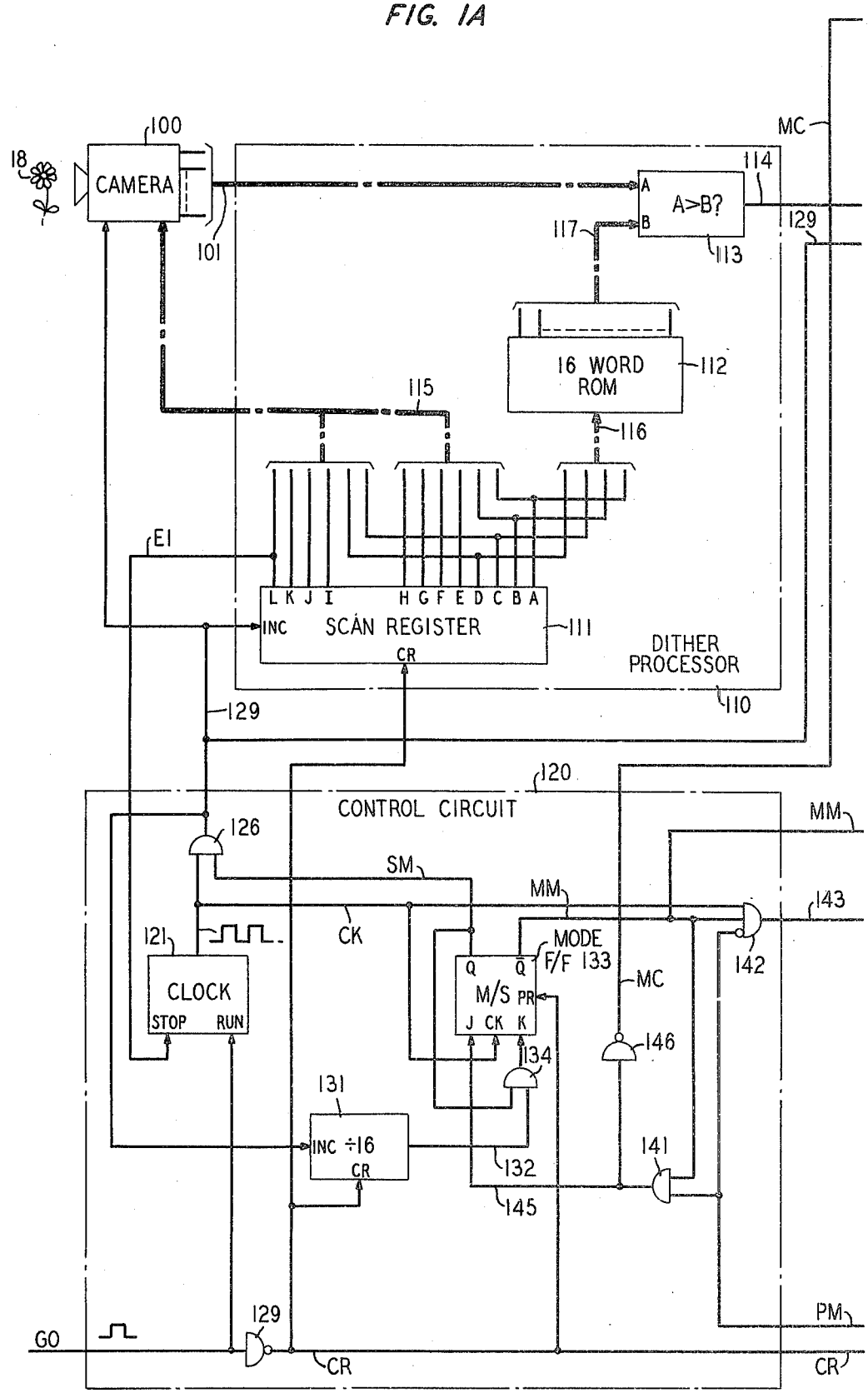
Figure 1B:
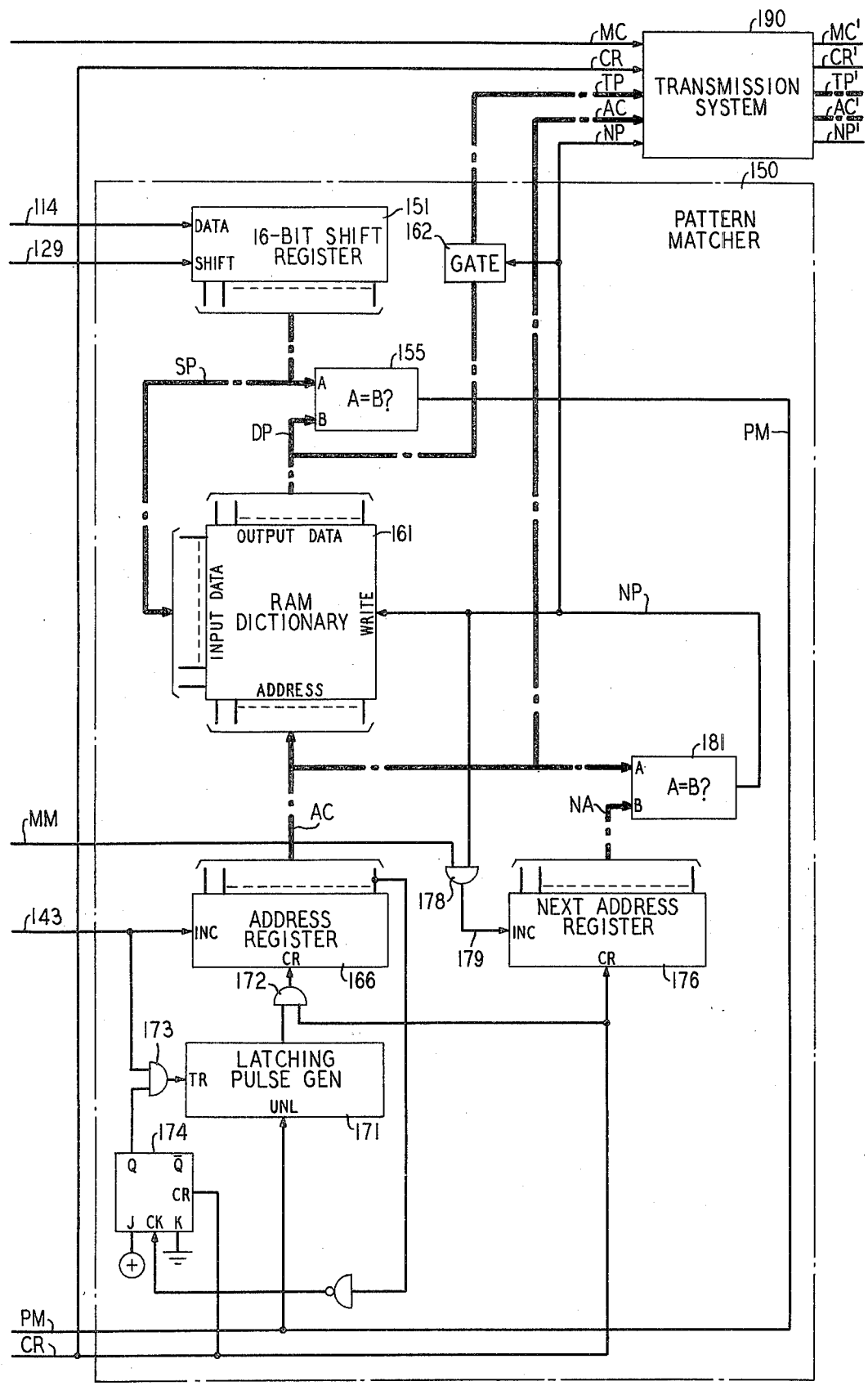

FIGS. 1A, 1B and 2, when arranged as shown in FIG. 3, depict a dithered display system including pattern matching circuitry embodying the principles of the present invention. The system includes a transmitter 10, which is shown in FIGS. 1A and 1B and a receiver 20, which is shown in FIG. 2.

Transmitter 10 includes digital camera 100, dither processor 110, control circuit 120 and pattern matcher 150. Pattern matching data generated by transmitter 10 is extended to receiver 20 via transmission system 190 which is also shown in FIG. 1B.

The heart of receiver 20 is a bi-level display panel 240. Panel 240 is illustratively a plasma panel of conventional design, and comprises a square matrix of 4096 display cells. An illustrative image 18 to be presented on panel 240 is scanned in a matrix of 4096 picture elements, each corresponding to a different cell of panel 240. As indicated in FIG. 4, the 64 rows and 64 columns of the picture element matrix are each numbered serially from 0 to 63. The intensity of each scanned picture element of image 18 is quantized into one of (illustratively) 256 intensity levels, or values, between 0 and 255. These are indicated by the upper number at each picture element location in FIG. 4.

Since panel 240 is a bi-level display medium, its cells can reside in only one of two states — either fully energized, or on, or fully de-energized, or off. Thus, unlike a full-gray-scale display medium, such as a cathode-ray tube, a bi-level display panel cannot present the full-gray-scale information, i.e. the precise intensity, of each scanned picture element of image 18. Advantageously, however, circuitry in the display system implementing the ordered dither thresholding technique provides panel 240 with the capability of displaying a very good approximation of the gray values in scanned images.

Thus, as indicated in FIG. 4, the scanned image picture element matrix is divided into a plurality of 16-element submatrices. Each threshold value from the illustrative dither matrix $$\begin{bmatrix} 0 & 128 & 32 & 160 \\ 192 & 64 & 224 & 96 \\ 48 & 176 & 16 & 144 \\ 240 & 112 & 208 & 80 \end{bmatrix}$$

is assigned to a spatially corresponding picture element in each submatrix. The lower number at each picture element location is the dither threshold value assigned that picture element. The quantized intensity value of each picture element is then compared to its assigned dither threshold value. If the intensity value of any given picture element is greater than its assigned dither threshold value, the corresponding cell in the display panel is turned on. Otherwise, the cell is maintained off.

FIG. 5 is a map of the on and off cells generated when image 18 is dither processed in the manner described above. On and off cells are represented in FIG. 5 by display bits, or "dithered image bits," of value 1 and 0, respectively. When a large number of closely-spaced bi-level display cells are selectively energized in accordance with a dithered image bit map such as that of FIG. 5, a gray-scale representation of the original scanned image is provided. See, for example, the dithered images in my copending patent application, Ser. No. 560,505, filed Mar. 19, 1975, now U.S. Pat. No. 3,997,719 issued Dec. 14, 1976.

A dithered image may be transmitted from one point to another by, for example, transmitting the value of each of every dithered image bit in a serial bit stream. This approach is wasteful of bandwidth and transmission time, however. My copending patent application entitled "Image Transmission Method and Apparatus," Ser. No. 596,954, filed on July 7, 1975, now U.S. Pat. No. 3,967,052 issued June 29, 1976, teaches an advantageous technique for reducing the bandwidth and/or time necessary to transmit a dithered image. The present invention is directed to an alternate such technique, as will now be explained.

An i row by j column group of N dithered image bits can represent any of $2^{(i \times j)}$ cell energization patterns since each display cell can reside in either of two states. For example, the bits of a 4 × 4 dithered image bit group can represent any of over 65,000 patterns. However, I have discovered that, typically, only a very small fraction of all possible patterns actually appear in a given dithered image (specific numbers are discussed hereinbelow), with a large number of these patterns appearing over and over again. A substantial reduction in the amount of data, and consequently the bandwidth and/or time necessary to transmit a dithered image to a remotely located display panel, is thus achieved in the illustrative embodiment of FIGS. 1A, 1B and 2 by circuitry which assigns a code word to each different N-bit pattern which does appear in the image, transmits each pattern and its code word only once to receiving circuitry for the display panel, and identifies to the receiving circuitry the states of the cells of each $i \times j$ cell group by transmitting thereto the code word associated with the pattern in which those cells are to be energized.

The display system of the illustrative embodiment uses 4 × 4 dithered image bit groups and 8-bit code words. Each of the groups illustratively corresponds to one of the 16-element submatrices previously described. This is merely a matter of convenience, however, and is not necessary to the invention, as is discussed in further detail hereinafter.

Specific reference is now made to transmitter 10 of FIGS. 1A and 1B. Operation of transmitter 10 is initiated by a start pulse on lead GO. This start pulse may be generated, for example, by a controlling computer or by a human operator via a push button. The start pulse raises lead GO to a high state, the transmitter illustratively using a positive logic system in which the 1, or high, state is represented by a small positive potential, such as 5 volts, and the 0, or low, state is represented by ground potential. With lead GO high, clear lead CR at the output of inverter 129 goes low, thereby clearing divide-by-16 counter 131 in control circuit 120 to zero and presetting mode flip-flop 133 to its Q = 1, i.e., Q output high, state. The low level on lead CR also clears image scan register 111 in dither processor 110 and it clears next-address register 176 and flip-flop 174 in pattern matcher 150. The low level on lead CR also clears address register 166 in pattern matcher 150 via gate 172 and is extended to receiver 20 via transmission system 190, of which more hereinbelow. The subsequent negative transition of the start pulse on lead GO triggers the RUN input of clock 121 and operation of the latter begins.

Clock 121 generates a train of regularly-spaced pulses, which are extended to one input of AND gate 126 via clock lead CK. The other input for AND gate 126 is taken from the Q output of mode flip-flop 133 via lead SM (Scanning Mode). Lead SM is high, indicating that transmitter 10 is now in its image scanning mode. Each successive clock pulse on lead CK is thus coupled through gate 126 to lead 129, thence to camera 100 and to scan register 111.

Register 111, illustratively a 12-bit binary counter having lowest- through highest-order output leads A through L, is incremented by one count in response to each negative transition on lead 129. Addresses for camera 100 are extended thereto by register 111 via cable 115. Each address on cable 115 comprises a 6-bit column address taken from leads A, B, E, F, G and H and a 6-bit row address taken from leads C, D, I, J, K and L. Camera 100 responds to the positive transition on each pulse on lead 129 to scan the small region, i.e., picture element, of image 18 indicated by the current address on cable 115. A binary word representing the intensity of the scanned picture element is extended to the A input of multibit comparator 113 via cable 101. The arrangement of address leads in cable 115 is such that camera 100 scans the picture elements of image 18 in 4 × 4 groups. The 16 picture elements defined by the intersection of rows 0–3 and columns 0–3 are scanned first, the sequence therewithin being left-to-right, top-to-bottom. The picture elements of the group defined by the intersection of rows 0–3, columns 4–7 are scanned next, and so forth, with the 4 × 4 picture element groups again being scanned in a left-to-right, top-to-bottom sequence.

Output leads A through D of register 111 form another set of addresses, which are applied to 16-word read-only memory (ROM) 112. These addresses, which appear on cable 117, cycle from 0000 to 1111 (decimal 15) and back to 0000 in response to each set of sixteen pulses on lead 129. ROM 112 stores binary representations of the 16 threshold values of the above dither matrix in the order 0, 128, 32, 160, 192, 64, etc. Thus as the binary word representing the intensity of a currently-scanned picture element is applied to the A input of comparator 113, ROM 112 applies a binary word representing the dither threshold value assigned to that picture element at the B input of comparator 113.

The signal level on output lead 114 of comparator 113 represents the dithered image bit associated with the currently scanned picture element. If the intensity of that picture element exceeds its assigned dither threshold (i.e., the A input word is larger than the B input word), lead 114 is high, indicating a dithered image bit value of 1. Lead 114 is otherwise low, indicating a dithered image bit value of 0.

In addition to incrementing the count in register 111, each negative transition on lead 129 enters the current lead 114 signal level into shift register 151 of pattern matcher 150. The propagation delay through register 111 and ROM 112 is sufficiently large that the signal level on lead 114 is entered in shift register 151 before the count in register 111, and thus possibly the level on lead 114, change. After 16 clock pulses, register 151 holds the dithered image bit values associated with the first 4 × 4 picture element group of image 18.

At this time, mode flip-flop 133 switches states and scanning of image 18 is suspended. In particular, it will be noted that flip-flop 133 is a master/slave J-K device. The signal levels at the J and K inputs of flip-flop 133 are locked into the flip-flop in response to positive transitions on clock lead CK. These signal levels determine the state in which the flip-flop is established in response to the following lead CK negative transition. Up to this point, both the J and K inputs of flip-flop 133 have remained low. As a result, flip-flop 133 has heretofore remained in its original $\overline{Q} = 1$ state. However, output lead 132 of divide-by-16 counter 131, which was initially low, goes high in response to the fifteenth negative transition on lead 129. Since lead SM is also high, AND gate 134 applies a 1 to the K input of flip-flop 133. Lead 145 at the J input of flip-flop 133 remains low. Thus, the leading edge of the 16th clock pulse locks the values $J = 0$, $K = 1$ into flip-flop 133. Therefore, the next clock pulse trailing edge, in addition to causing the 16th dithered image bit to be shifted into register 151, also switches flip-flop 133 to its $\overline{Q} = 1$ state. Lead SM is now low. No further signals appear on lead 129 and, as previously indicated, scanning of image 18 is suspended. Lead MM (Matching Mode) at the Q output of flip-flop 133 is now high, however, indicating that the transmitter is now in its pattern matching mode.

The operation of pattern matcher 150 is centered about dictionary 161, which is illustratively a random access memory (RAM). The function of dictionary 161 is to store individual 16-bit words, each representing a different one of the patterns which occur in the dithered version of image 18. Each of these words, or patterns, is stored in an individual memory location of the dictionary. Pattern matcher 150 further includes address register 166, which is illustratively an 8-bit binary counter. The bits comprising the output data word of register 166 on cable AC (Address/Code) are applied to the address input leads of dictionary 161. A particular memory location in the dictionary is accessed for input and output functions by estabilshing the count in register 166 at an address assigned to that location. The bits of the dictionary pattern stored in the selected location are provided in parallel form on output cable DP (Dictionary Pattern) whenever its address/code word appears on cable AC. A pattern is entered, or written, into the location by applying the bits of the pattern to the data input leads of dictionary 161 via cable SP and concurrently pulsing its write input terminal.

The pattern on cable DP is applied to the B input of multibit comparator 155. The A input of comparator 155 is an "image word," or pattern, comprising the 16 bits stored in shift register 151 and provided in parallel form on cable SP (Scanned Pattern). Lead PM (Pattern Matched) at the ouput of comparator 155 is high whenever the scanned pattern on cable SP and the dictionary pattern on cable DP match, i.e. are identical. Lead PM is otherwise low.

Pattern matcher 150 also includes next-address register 176, which is also an 8-bit binary counter. The function of register 176 is to keep track of the address of the first empty memory location in dictionary 161. The 8-bit address at the output of register 176 is extended via cable NA (Next Address) to multibit comparator 181, which compares it to the address/code word on cable AC. Output lead NP (New Pattern) of comparator 181, which is extended to the write input terminal of dictionary 161, is high when the addresses on cables AC and NA are identical, and is low otherwise.

In considering the operation of pattern matcher 150, it will be recalled that clock lead CK has just gone low and flip-flop 133 is in its $\overline{Q} = 1$ state. Lead MM at the $\overline{Q}$ output of flip-flop 133 is high. Output lead 143 of gate 142 is low, however, since lead CK is low. Thus address register 166, which is incremented by one count in response to each positive transition on lead 143, remains in its initial, cleared state with the address/code word on cable AC being 00000000. Next-address register 176 currently stores this same address. Lead NP is thus high and the scanned pattern on cable SP is written into the first memory location of dictionary 161.

This first pattern appears almost immediately thereafter on cable DP. Lead PM goes high, indicating (quite trivially in this case) that the current pattern in register 151 has been matched to a pattern in dictionary 161. Since leads MM and PM are now both high, output lead 145 of AND gate 141 in control circuit 120 goes high. The resulting positive transition on lead 145 generates a negative transition on output lead MC (Matching Completed) of inverter 146. The fact that lead NP is high at this time indicates that the pattern now on cable 162 is a "new" pattern, i.e., one which has not yet been transmitted to receiver 20. Gate 162 is enabled, thereby passing the pattern on cable DP through to cable TP (Transmit Pattern). Transmission system 190, which may be similar in function to that disclosed, for example in U.S. Pat. No. 3,560,660 issued to I. Poretti on Feb. 2, 1971, responds to the above-mentioned negative transition on lead MC to scan the data on cables TP and AC and lead NP and to transmit same to receiver 20 along with the lead MC signal itself.

The next positive clock pulse transition on lead CK locks the values $J = 1$, $K = 0$ into flip-flop 133. Lead 143 remains low since gate 142 is inhibited by the high level on lead PM. Thus, address register 166 is not incremented at this time. Leads MM and NP, and thus output lead 179 of AND gate 178 are high at this time. The following clock pulse negative transition returns flip-flop 133 to its $Q = 1$ state. Lead MM goes low. The resulting negative transition on lead 179 increments the count in register 176 to 00000001. Accordingly, lead NP goes low.

With lead SM again high, scanning of image 18 resumes. As previously indicated, register 111 has already been incremented to a new value so the address of the next picture element to be scanned by camera 100 is already present on cable 115. Scanning thus proceeds in the manner described above, but now for the 16 picture elements defined by the intersection of rows 0–3 and columns 4–7. Dithered image bits corresponding to these picture elements are sequentially loaded into shift register 151. Flip-flop 133 is thereafter switched to its $Q = 1$ state; image scanning is suspended and pattern matching is reinitiated.

The addresses on cables AC and NA are now unequal. Lead NP is low and the scanned pattern on cable SP is not written into dictionary 161 at this time. Indeed, the pattern on cable SP may be the same as the one previously stored, in which case no new dictionary entry is to be effected. Assume that, in fact, the patterns on cables SP and DP are the same. Lead PM and thus lead 145 go high, preparing transmitter 10 for a return to its image scanning mode. Again, the negative transition on lead MC indicates that pattern matching has been completed. The current low level on lead NP indicates that the current scanned pattern is an "old" pattern, i.e., that it is the same as one previously stored in dictionary 161. Gate 162 is disabled. Thus when transmission system 190 is again pulsed by the negative transition on lead MC, there is no data on cable TP to be transmitted; rather, only the address/code word on cable AC, and the signals on leads MC and NP are transmitted to receiver 20.

On the other hand, the patterns on cables SP and DP may have been different when pattern matching resumed. If so, lead PM remains low. Output lead 143 of gate 142 goes high in response to the next positive clock pulse transition, incrementing the count in register 166 to 00000001. Now the addresses on cables AC and NA are the same. Lead NP goes high, thereby entering the new pattern into dictionary 161 at the location identified by address/code word 00000001. The patterns on cables SP and DP are now the same. Leads PM and 145 go high, while lead MC goes low. Since lead NP is now high, gate 162 is enabled; transmission system 190 responds to the negative transition on lead MC by transmitting both the pattern on cable TP and its associated address/code word on cable AC along with the other lead signals.

The next clock pulse negative transition has no effect on the state of flip-flop 133 since both its J and K inputs were low prior to the previous positive transition on lead CK. However, the next positive transition locks $J = 1$, $K = 0$ into flip-flop 133, and the following negative transition returns the flip-flop to its $Q = 1$ state. Next-address register 176 is incremented by the resulting negative transition on lead 179 and transmitter 10 returns its scanning mode, this time scanning the picture elements defined by the intersection of rows 0–3 and columns 8–11.

When transmitter 10 thereafter returns to its pattern matching mode, the address/code word in register 166 is the same as it was when pattern matching was last suspended. Thus, the scanned pattern in register 151 is first compared to the last pattern entered in dictionary 161. This is advantageous because the dithered image bits corresponding to two adjacent scanned picture element groups often have the same bit pattern. Thus, a quick match is made and the transmitter can return almost immediately to its image scanning mode.

If there is no match, however, lead MM remains high and the next positive clock transition causes lead 143 to go high. Flip-flop 174, initially in its $\overline{Q} = 1$ state, was switched into its $Q = 1$ state when the count in register 166 was incremented from 00000000 to 00000001. The output of AND gate 173 thus goes high in response to the high level on lead 143, and latching pulse generator 171 is triggered. The latter, which may be similar to the circuit disclosed in U.S. Pat. No. 3,681,622, issued to S. A. Dalyai on Aug. 1, 1972, extends a momentary clear signal through gate 172, thereby clearing the count in address register 166 to 00000000. Latching pulse generator 171 did not operate in response to the previous positive transition on lead 143 since flip-flop 174 was in its $\overline{Q} = 1$ state at that time. If the current scanned pattern on cable SP does not match the dictionary pattern stored at the location identified by the address 00000000, transmitter 10 remains quiescent until the next positive transition on lead 143 occurs. Latching pulse generator 171 will not respond to this or any subsequent pulse on lead 143 until it is unlatched, which will happen only after a match or pattern entry has been made and lead PM goes high. Thus, register 166 continues to be incremented until one of those two alternatives eventuates.

The rest of image 18 is scanned and patternmatched in a similar manner, at which point a negative transition appears on register 111 output lead L. This negative transition is applied to the STOP input of clock 121 via lead EI (End of Image). Transmitter 10 thus enters an idle condition until such time as another start pulse is applied to lead GO.

Attention is now directed to receiver 20 of FIG. 2, which includes monostable multivibrator 210, clock 214, divide-by-16 counter 218, 16-bit shift register 221, dictionary 261, panel register 231 and, as previously mentioned, display panel 240. The signals on leads MC, CR and NP and cables TP and AC of transmitter 10 are extended to receiver 20 from transmission system 190 on leads MC', CR', and NP' and cables TP' and AC', respectively.

When lead CR of transmitter 10 goes low in response to the start pulse on lead GO, lead CR' of receiver 20 similarly goes low, thereby clearing register 231. The subsequent negative transition on lead MC' triggers multivibrator 210 to its quasi-stable state during which a positive pulse is generated on lead 211. The latter extends to one input of AND gate 265. The other input for gate 265 is taken from lead NP'. Thus, if a new pattern is being transmitted to receiver 20, which is always the case for the first pattern, gate 265 is enabled and the pattern on cable TP' is written into dictionary 261 at the location indicated by the address/code word on cable AC'. That pattern appears almost immediately on dictionary output cable DP' whence it is applied to the parallel input leads of shift register 221. The subsequent negative transition on lead 211 loads the pattern on cable DP' into shift register 221. That negative transition also initiates operation of clock 214.

The first positive transition on output lead 215 of clock 214 creates a negative transition on output lead 242 of inverter 241. Lead 242 is connected to the STROBE input of display panel 240 and the negative transition on that lead causes panel 240 to access the display cell identified by the address on output cable 232 of panel register 231. The addressed cell is thereby established in the state indicated by the bit in the right most stage of shift register 221, that bit now appearing on serial output lead 224. The trailing edge of the first clock pulse shifts the next display bit in register 221 to lead 224. It also increments the count in register 231. Output leads A through L of register 231 are arranged in cable 232 in the same order in which the output leads of image scan register 111 are arranged in cable 115. Thus addresses are generated on cable 232 in the same order that they are generated on cable 115.

The next positive transition on lead 215 causes the next display bit value to be displayed on panel 240, and so forth for all of the bits in register 221. At this time, a negative transition appears on output lead 219 of divide-by-16 counter 218, thereby suspending the operation of clock 214.

Subsequent negative transitions on lead MC' each cause another group of sixteen dithered image bits to be displayed on panel 240. In particular, if a given group of bits represent a "new" pattern, that pattern is stored in dictionary 261 in the manner described above prior to being displayed on panel 240. If, on the other hand, the bits represent an old pattern, no data appears on cable TP' and lead NP' is low. Thus, the multivibrator signal on lead 211 does not pulse the write input of dictionary 261. Rather, the code word then appearing on cable AC' causes the appropriate pattern to be read out of dictionary 261 and provided on cable DP' whence it is displayed on panel 240.

Operation of receiver 20 terminates when the full dithered image has been displayed on panel 240, as evidenced by the cessation of negative transitions on lead MC'. The dithered image remains displayed on panel 240 until a subsequent pulse appears on lead CR', thereby preparing the receiver to accept a new set of patterns and address/code words.

The display system of the illustrative embodiment assigns a unique code word to each different pattern which occurs in a dithered image, thereby assuring that each and every cell of the image presented on panel 240 is established in the "right" state. However, even if a small number of cells were to be in the "wrong" state, the viewer will usually not perceive same. Thus, pattern matching circuitry in accordance with the invention may, for example, assign the same code word to two patterns which differ from one another by one dithered image bit. This approximate matching technique reduces the total number of code words necessary to define the image and, advantageously, reduces the required code word length. Image degradation is kept to a minimum when at least one of the two patterns assigned to the same code word occurs infrequently in the image or images of interest.

Other variations of the illustrative embodiment lie within the scope of the invention. Thus, although the display system of FIGS. 1A, 1B and 2 uses fixed length, i.e. 8 bit, code words, pattern matching circuitry according to the invention may employ known variable-length-encoding techniques to assign short code words to the most-frequently-occurring patterns and longer code words to those which occur less frequently. Typically, such an arrangement would first scan, dither process and pattern match an entire image to determine which patterns should be assigned to the longer code words and which the shorter.

Display panel 240 is shown by way of example as having $(64)^2$ i.e., 4096 cells. However, commercially available plasma panels may have as many as $(512)^2$, i.e., over a quarter-million, cells. The dithered display system of the illustrative embodiment may be modified in obvious manner to accommodate such larger panels by simply expanding the number of bits in registers 111 and 231 and using those additional bits to expand the addresses on cables 115 and 232, respectively. The bit capacities of certain of the components of the display system may also have to be expanded.

Furthermore, it will be appreciated that although the illustrative embodiment works with 4 × 4 groups, or patterns, other pattern sizes may be used. Larger patterns means that fewer code words need to be transmitted to define a particular image. However the larger the pattern size, the larger the number of patterns which appear in an image, and thus the larger the required code word length. Better results will usually be obtained by using groups which have numbers of rows and columns which are powers of 2. However, the optimum pattern size for a particular application, i.e., that which results in the greatest data reduction, can best be determined by analyzing the particular images to be transmitted. As an example, a typical 512 × 512 cell dithered image may have approximately 185 different 4 × 4 patterns, 1075 different 4 × 8 patterns and 2350 different 8 × 8 patterns, requiring an average of approximately 0.45, 0.38 and 0.48 bits per picture element (including the dictionary) to transmit the entire image.

The illustrative embodiment of FIGS. 1A, 1B and 2 can be modified to work with 4 × 8 patterns, for example, by taking the 6-bit column and row addresses on cables 115 and 232 from register 111 and 231 output leads A, B, C, F, G and H and leads D, E, I, J, K and L, respectively, and appropriately enlarging the bit capacities of the various components of pattern matcher 150 and receiver 20.

The dither matrix used by the display system of FIGS. 1A, 1B and 2 is also illustrative. For example. although that dither matrix has sixteen thresholds, other size dither matrices such as those having four thresholds or 64 thresholds are also commonly used. In generating a dither matrix for a given application, the dither matrix size is first decided upon. The threshold values are then chosen. It is conventional to distribute the threshold values across substantially the entire picture element intensity quantization range (in the illustrative embodiment, the range 0–255), with numerically successive threshold values having a constant difference between them. However, other threshold value selection criteria may be employed to provide, for example, increased or decreased contrast and/or brightness in the dithered image. See my copending application, Ser. No. 560,505, filed Mar. 19, 1975, now U.S. Pat. No. 3,997,719 issued Dec. 14, 1976.

The selected threshold values are then arranged within the dither matrix. It has been found that optimum gray-scale and picture resolution characteristics are achieved when numerically successive threshold values are substantially spatially separated from one another within the matrix. In the dither matrix utilized in the illustrative embodiment, for example, the 0 is relatively distant from the 16, which is relatively distant from the 32 and so forth.

More generally, the above-described spatial separation criterion can be satisfied for an $n$-by-$n$ dither matrix, for example, $n$ being an integer power of 2, by arranging the $n^2$ threshold values of the dither matrix in the order defined by a dither operator $\hat{D}_n$. The latter is derived by combining the four operator matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangements such as $$\hat{D}_n = \begin{bmatrix} [4\hat{D}_{n/2}] & [4\hat{D}_{n/2} + 2\hat{U}_{n/2}] \\ [4\hat{D}_{n/2} + 3\hat{U}_{n/2}] & [4\hat{D}_{n/2} + \hat{U}_{n/2}] \end{bmatrix}$$

This is a recursive definition in which $\hat{D}_2$ is a two-by-two matrix comprising the numbers 0, 1, 2 and 3 such as the matrix $$\begin{bmatrix} 0 & 2 \\ 3 & 1 \end{bmatrix}$$

and $\hat{U}_2$ is a two-by-two matrix each element of which is 1. It is preferable, although not necessary, that the operator matrices $[4\hat{D}_{n/2}]$ and $[4\hat{D}_{n/2} + \hat{U}_{n/2}]$ be on the same one diagonal of dither operator $\hat{D}_n$, such as in the above arrangement, and the numbers 0 and 1 be on the same one diagonal of operator matrix $\hat{D}_2$.

Using the above definition, one of several possible $\hat{D}_4$ dither operators is, for example, $$\hat{D}_4 = \begin{bmatrix} 0 & 8 & 2 & 10 \\ 12 & 4 & 14 & 6 \\ 3 & 11 & 1 & 9 \\ 15 & 7 & 13 & 5 \end{bmatrix}$$

The dither matrix, $$\begin{bmatrix} 0 & 128 & 32 & 160 \\ 192 & 64 & 224 & 96 \\ 48 & 176 & 16 & 144 \\ 240 & 112 & 208 & 80 \end{bmatrix}$$

is thus seen to have been derived by taking the threshold values 0, 16, 32, 48, etc. which were previously selected, and placing them in the 0, 1, 2, 3, etc., positions, respectively, of the $\hat{D}_4$ dither operator.

In the illustrative embodiment, dithered images are pattern matched, transmitted and displayed "on the fly," i.e., as they are scanned. In other applications, however, it may be desired to store the dictionary and code words defining an image for later retrieval. For example, one of the most widespread uses of plasma panels to date is in computer-aided instruction (CAI) systems. Test, pictures, test questions and the like are presented on the display panel under computer control; a student sitting in the terminal interfaces with the system via a keyboard. Each gray-scale image to be presented during a CAI lesson could be scanned, dither processed and pattern matched at the time that the courseware for the lesson, i.e., its text, pictures, instruction sequence, etc., is first generated by the instructor. When the plan of a lesson in progress calls for the presentation of the particular image, its dictionary and the code words defining the image can then be read out of storage and transmitted to the display panel.

Alternatively, the dictionary could be transmitted to the display terminal at any convenient time prior to the transmission of the code words defining the image, for example, at a time just before the lesson itself begins. Or, the dictionaries for a number of images can be combined into a single dictionary common to all. This dictionary will be somewaht, although not very much, larger than that associated with a single dithered image because patterns which occur most frequently in a given dithered image usually appear with corresponding frequency in other dithered images. It may be found that no additional code word bits are required to accommodate the larger number of code words associated with the common dictionary. However, even if the code words must be lengthened, this may be more than offset by the fact that only a single dictionary need be sent for a number of images. Alternatively, those patterns and their associated code words which occur most frequently in dithered images generally, may be permanently stored at the display terminal, such as in a read-only memory. The dictionary which is transmitted would then need to include only those less-frequently occurring patterns which are unique to the images appearing in, for example, a particular CAI lesson.

It will thus be appreciated that those skilled in the art will be able to devise many and various arrangements not specifically disclosed herein but which are within the scope of the invention as defined by the below claims.

What is claimed is:

1. Display apparatus comprising
   means for generating a plurality of image words representing respective N-bit patterns of a dithered image,
   means for generating a plurality of multibit data words each corresponding to a respective one of said image words, each data word having less than N bits, and
   means responsive to each data word for displaying the pattern associated with the image word corresponding to that data word.

2. Display apparatus comprising
   dither means for generating a plurality of image words each having N ordered bits, said image words representing respective associated two-dimensional bit patterns of a dithered image,
   a first memory adapted to store different individual dictionary words each having N ordered bits,
   means for individually comparing each of said image words to ones of said stored dictionary words, said comparing means generating a first indication for each image word which is the same as an individual dictionary word then in said memory and a second indication for each other image word,
   means operative in response to each first indication for providing a data word identifying said individual dictionary word, and
   means for storing in said memory as a dictionary word each of said image words for which said second indication has been generated.

3. The invention of claim 2 further comprising display means and means for transmitting each data word to said display means, said display means responding to each transmitted data word to display a respective pattern associated with said individual dictionary word.

4. The invention of claim 3 wherein said display means includes,
   a second memory,
   means for transmitting each of said dictionary words to said second memory for storage therein,
   means responsive to each transmitted data word for retrieving from said memory the dictionary word identified thereby,
   a display panel comprising a plurality of groups of display cells, and
   means for energizing individual cells of each cell group in response to a respective dictionary word retrieved from said memory.

5. The invention of claim 3 wherein each of said dithered image bit patterns comprises a plurality of rows and a plurality of columns of dithered image bits, each of said row and column pluralities being a power of 2.

6. The invention of claim 3 wherein said dither means comprises means for scanning an image in a matrix of picture elements each having a predetermined intensity and each having a predetermined dither threshold assigned thereto, and means for generating said image words in response to individual comparisons between the intensity of each picture element and its assigned dither threshold.

7. The invention of claim 6 wherein said picture elements are arranged in a plurality of submatrices of said picture element matrix and wherein the threshold assigned to each picture element of each of said submatrices comprises a spatially corresponding threshold from a predetermined dither matrix in which thresholds having numerically successive values are substantially spatially separated from one another.

8. The invention of claim 7 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

9. Apparatus for presenting a dithered image on a display panel, the image being represented by a plurality of dithered image bits each corresponding to a respective display cell of said panel, said apparatus comprising
   means for storing signal representations each representing different two-dimensional N-bit binary display patterns and operative in response to each of a plurality of less-than-N-bit code words to provide a selected one of said signal representations as determined by said each code word,
   means for applying a succession of code words to said storing means, each code word of said succession being such that said storing means provides a signal representation of the pattern of an N-bit group of said dithered image bits associated with each code word of the succession, and
   means responsive to each signal representation provided in response to said succession of code words for displaying the pattern represented by said each signal representation.

10. The invention of claim 9 wherein each of said two-dimensional N-bit binary display patterns is a pattern which occurs in said dithered image.

11. A display method comprising the steps of
    generating a plurality of image words representing respective N-bit patterns of a dithered image,
    generating a plurality of multibit data words each corresponding to a respective one of said image words, each data word having less than N bits and each embodying a code associated with the pattern represented by its corresponding image word, and
    displaying in response to each data word the pattern associated with the code which that data word embodies.

12. A display method comprising the steps of
    generating a plurality of image words each having N ordered bits, said image words representing respective associated two-dimensional bit patterns of a dithered image,
    storing in a first memory different individual dictionary words each having N ordered bits,
    individually comparing each of said image words to ones of said stored dictionary words and generating a first indication for each image word which is the same as an individual dictionary word then in said memory and a second indication for each other image word,
    transmitting to a display panel in response to each first indication a data word identifying said individual dictionary word, and
    storing in said memory as a dictionary word each of said image words for which said second indication has been generated.

13. The invention of claim 12 comprising the further step of displaying on said display panel in response to each transmitted data word a pattern predeterminately associated with said individual dictionary word.

14. The invention of claim 13 wherein said displaying step includes the steps of
transmitting each of said dictionary words to a second memory for storage therein,
retrieving from said memory in response to each transmitted data word the dictionary word identified thereby, and
energizing individual cells of each of a plurality of cell groups of said display panel in response to a respective dictionary word retrieved from said memory.

15. The invention of claim 13 wherein each of said dithered image bit patterns comprises a plurality of rows and a plurality of columns of dithered image bits, each of said row and column pluralities being a power of 2.

16. The invention of claim 13 wherein said image word generating step comprises the steps of scanning an image in a matrix of picture elements each having a predetermined intensity and each having a predetermined dither threshold assigned thereto, and generating said image words in response to individual comparisons between the intensity of each picture element and its assigned dither threshold.

17. The invention of claim 16 wherein said picture elements are arranged in a plurality of submatrices of said picture element matrix and wherein the threshold assigned to each picture element of each of said submatrices comprises a spatially corresponding threshold from a predetermined dither matrix in which thresholds having numerically successive values are substantially spatially separated from one another.

18. The invention of claim 17 wherein said dither matrix comprises $n^2$ dither thresholds, $n$ being an integer power of 2, and wherein said dither thresholds are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

19. A method for presenting a dithered image on a display panel, the image being represented by a plurality of dithered image bits each corresponding to a respective display cell of said panel, said method comprising the steps of
storing in a memory signal representations each representing different two-dimensional N-bit binary display patterns, said memory being operative in response to each of a plurality of less-than-N-bit code words to provide a selected one of said signal representations as determined by the value of said each code word,
applying a succession of code words to said memory, each code word of said succession being such that said memory provides a signal representation of the pattern of an N-bit group of said dithered image bits associated with each code word of the succession, and
displaying the pattern represented by each signal representation provided in response to said succession of code words.

20. The invention of claim 19 wherein each of said two-dimensional N-bit binary display patterns is a pattern which occurs in said dithered image.

* * * * *